United States Patent
Ishfaq et al.

(10) Patent No.: US 9,532,305 B2
(45) Date of Patent: Dec. 27, 2016

(54) CONTROLLING VOLTE SERVICE AT VEHICLE TELEMATICS UNITS

(71) Applicant: General Motors LLC, Detroit, MI (US)

(72) Inventors: Mohammad Ishfaq, Northville, MI (US); David George, Farmington Hills, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 14/702,405

(22) Filed: May 1, 2015

(65) Prior Publication Data

US 2016/0323814 A1    Nov. 3, 2016

(51) Int. Cl.
*H04W 48/20* (2009.01)
*H04W 4/02* (2009.01)
*H04W 60/04* (2009.01)
*H04L 29/06* (2006.01)
*H04W 60/06* (2009.01)

(52) U.S. Cl.
CPC .......... *H04W 48/20* (2013.01); *H04L 65/1016* (2013.01); *H04W 4/02* (2013.01); *H04W 60/04* (2013.01); *H04W 60/06* (2013.01)

(58) Field of Classification Search
CPC ........ H04W 48/20; H04W 4/02; H04W 60/04; H04W 60/06; H04L 65/1016
See application file for complete search history.

(56) References Cited

U.S. PATENT DOCUMENTS

| 8,934,917 B1* | 1/2015 | Pal | H04W 48/18 455/450 |
| 2014/0185521 A1* | 7/2014 | Aksu | H04W 4/001 370/328 |
| 2016/0119823 A1* | 4/2016 | Ko | H04W 24/08 370/252 |

\* cited by examiner

*Primary Examiner* — Brandon Miller
(74) *Attorney, Agent, or Firm* — Christpher DeVries; Reising Ethington P.C.

(57) ABSTRACT

A system and method of controlling a VoLTE-capable vehicle telematics unit includes: detecting the location of the vehicle telematics unit; determining that one or more cell towers within a range of the location have begun supporting a modern cellular protocol in addition to one or more other cell towers supporting an earlier cellular protocol; and wirelessly transmitting an over-the-air (OTA) message to the vehicle telematics unit commanding the vehicle telematics unit to detach from an attached cell tower and re-attach to a cell tower using an IP multimedia subsystem (IMS) protocol.

8 Claims, 3 Drawing Sheets

CONTROLLING VOLTE SERVICE AT VEHICLE TELEMATICS UNITS

TECHNICAL FIELD

The present invention relates to cellular communications and, more particularly, to vehicle telematics units using cellular communications that support VoLTE.

BACKGROUND

Cellular communications systems generally support one or more cellular protocols that facilitate wireless connections between wireless devices or user equipment (UE) and cell towers operated by the cellular communications systems. Presently, these cellular communications systems are transitioning between earlier cellular protocols, such as 3G (e.g., CDMA 2000 and UMTS), and modern cellular protocols sometimes referred to as 4G long-term evolution (LTE). The modern cellular protocols support packet-switched voice and data communications over LTE, such as VoLTE, while the earlier cellular protocols involve circuit-switched cellular communications and do not support VoLTE. As the transitions occur between earlier cellular protocols as their modern counterparts, vehicle telematics units are capable of supporting both.

Unlike handheld UE, a vehicle telematics unit may not detach from a cell tower after a vehicle is turned off and the vehicle occupant leaves the vehicle. Instead, the vehicle telematics unit may remain attached to a cell tower for a week or more despite a lack of visible vehicle activity. When the vehicle telematics units are deployed in areas where the cellular communications systems only support the earlier cellular protocols, the units may camp on cell towers providing earlier cellular protocols for extended periods. Later, when the cellular communications systems begin to support the more modern cellular protocols, the vehicle telematics units may continue to use earlier protocols despite the availability of more modern cellular protocols.

SUMMARY

According to an embodiment of the invention, there is provided a method of controlling a voice over long-term evolution (VoLTE)-capable vehicle telematics unit. The method includes detecting the location of the vehicle telematics unit; determining that one or more cell towers within a range of the location have begun supporting a modern cellular protocol in addition to one or more other cell towers supporting an earlier cellular protocol; and wirelessly transmitting an over-the-air (OTA) message to the vehicle telematics unit commanding the vehicle telematics unit to detach from an attached cell tower and re-attach to a cell tower using an IP multimedia subsystem (IMS) protocol.

According to another embodiment of the invention, there is provided a method of controlling a VoLTE-capable vehicle telematics unit. The method includes attempting to register the vehicle telematics unit with a cell tower using a VoLTE cellular protocol; detecting a permanent rejection status at the vehicle telematics unit that occurred as a result of the attempt to register using the VoLTE cellular protocol and prevents the vehicle telematics unit from communicating via the cell tower; and commanding the vehicle telematics unit to detach and re-attach to the cell tower.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

Figure 1:
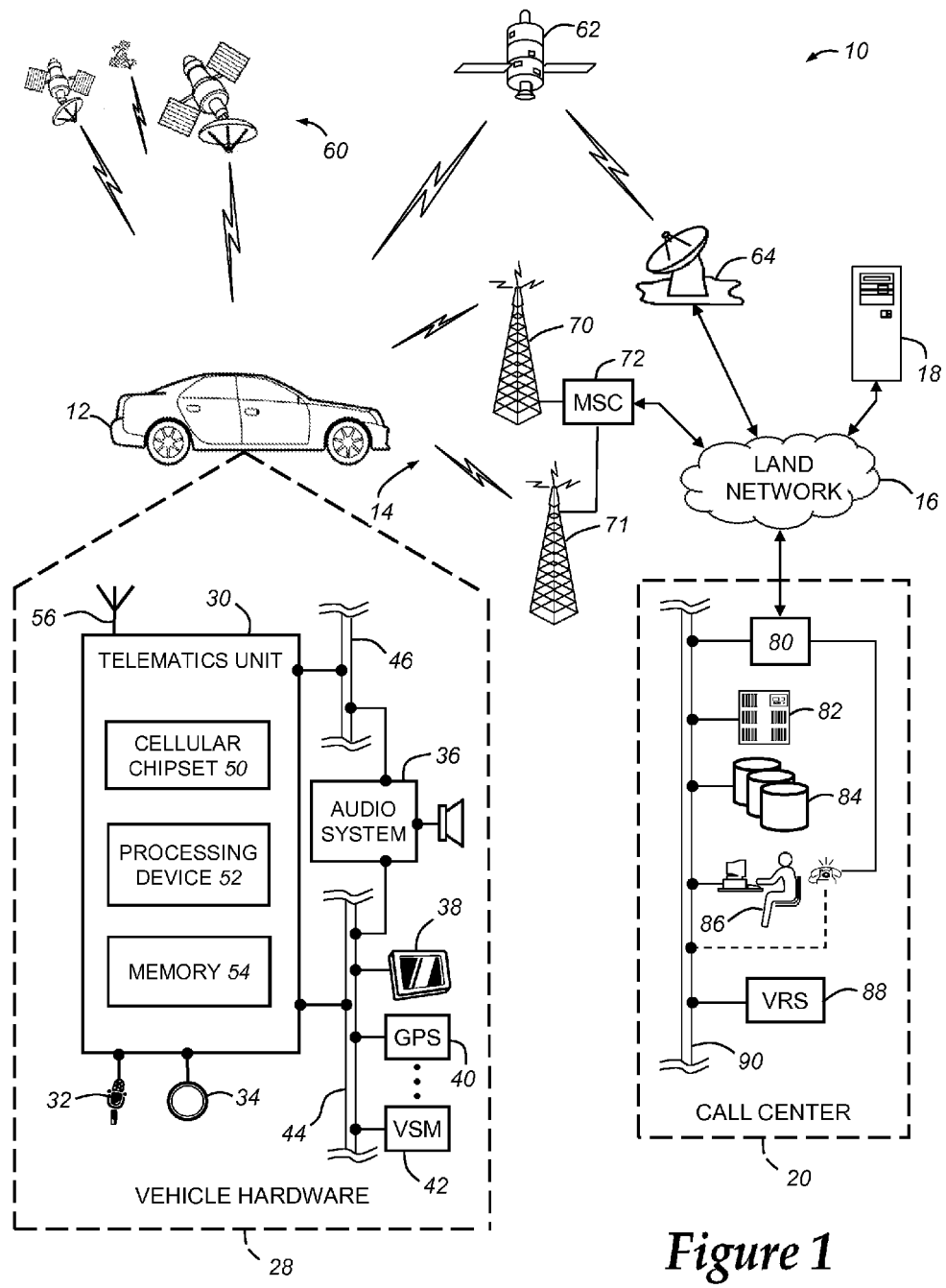
FIG. 1 is a block diagram depicting an embodiment of a communications system that is capable of utilizing the method disclosed herein.

The system and method described below control a vehicle telematics unit capable of supporting voice over long-term evolution (VoLTE) when earlier cellular protocols are used by nearby cell towers and more modern cellular protocols are implemented at other cell towers later. Sometimes VoLTE-supporting vehicle telematics units are deployed in areas where cell towers have not been converted from earlier cellular protocols to modern cellular protocols that can support VoLTE. When a vehicle is initially deployed in such an area, the vehicle telematics unit may attempt to attach to a local cell tower and establish VoLTE service. If a cell tower supporting a modern cellular protocol is not available, then the vehicle telematics unit may register with a cell tower supporting an earlier cellular protocol.

However, the vehicle telematics unit may remain attached to cell towers using the earlier cellular protocols even after other nearby cell towers have begun supporting modern cellular protocols. A vehicle occupant may have turned the vehicle ignition off and left the vehicle but the vehicle telematics unit can exist in a standby mode—often called a discontinuous receive (DRx) mode—during which time it remains attached to a cell tower. This can occur even after local cell towers begin to offer modern cellular protocols. Only when the vehicle has been idle for a significant amount of time, such as two weeks or more, will the vehicle telematics unit detach from the cell tower. Very few vehicles are idle for such an extended amount of time. As a result, many vehicles and their vehicle telematics units may remain attached to cell towers using earlier cellular protocols despite the availability of cell towers supporting more modern cellular protocols. The behavior of a vehicle telematics unit is unlike handheld user equipment (UE) used with cell towers that is detached from cell towers each time the user powers the UE off and on.

To ensure that vehicle telematics units register with cell towers supporting modern cellular protocols when they are available, the central facility can determine when a geographic area begins to offer modern cellular protocols to vehicle telematics units. When modern cellular protocols are offered in an area, the central facility can identify one or more vehicles that are located in the area and then transmit an over-the-air (OTA) signal that commands the vehicle telematics units of these vehicles to detach from the current cell tower and reattach to a local cell tower, which may or may not be the current cell tower. The reattachment process can include a preference for a modern cellular standard that supports VoLTE, which can ensure that if a VoLTE-supporting modern cellular protocol is available from a local cell tower, the vehicle telematics unit will select it.

In addition, the VoLTE-capable vehicle telematics unit can face other challenges when operating in an environment that only supports earlier cellular protocols. For instance, the vehicle telematics unit may attempt to register with a cell tower at its location after the vehicle is initially delivered to a new owner. If the vehicle is located where cell towers offer only an earlier cellular protocol, then the vehicle telematics unit may be placed in a permanent rejection mode in response to attempting to use a VoLTE-capable or modern cellular protocol. When handheld UE are placed in the permanent rejection mode, the user can reset the UE by powercycling the UE (i.e., by turning the UE off and then on again). In contrast, a vehicle user may not be able to turn off a vehicle telematics unit even though a vehicle ignition is in the off position. Thus, the vehicle telematics unit may be instructed to reset the permanent rejection mode without a user powercycling the unit. This can be carried out via an instruction that commands the cellular chipset in the vehicle telematics unit to powercycle the vehicle telematics unit based on a vehicle event. The vehicle event can be an off and then on cycle of the vehicle ignition, a predetermined amount of time, or other periodic action.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers two of which are depicted as 70 and 71, one or more mobile switching centers (MSCs) 72, as well as any other networking components required to connect wireless carrier system 14 with land network 16. Each cell tower 70, 71 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As used herein, the term "modern cellular protocol" should be understood to refer to a cellular or wireless communication standard defined by the 3GPP consortium and capable of supporting VoLTE. VoLTE cellular protocols include not only LTE or 4G LTE cellular protocols as they are defined by the 3GPP consortium and outlined in release 8 and 9 (e.g., HSPA+) but also more advanced implementations of LTE sometimes referred to as LTE Advanced, WiMAX-Advanced, or "True 4G." VoLTE can be implemented using an LTE cellular protocol and involve wireless voice communications carried out over the wireless carrier system 14 using an IP multimedia subsystem (IMS) protocol as it is defined by the 3GPP. "Earlier cellular protocol" generally refers to cellular protocols that do not support VoLTE, such as 3G or earlier circuit-switched wireless communications standards for cellular communication that were developed by 3GPP and 3GPP2 prior to LTE. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
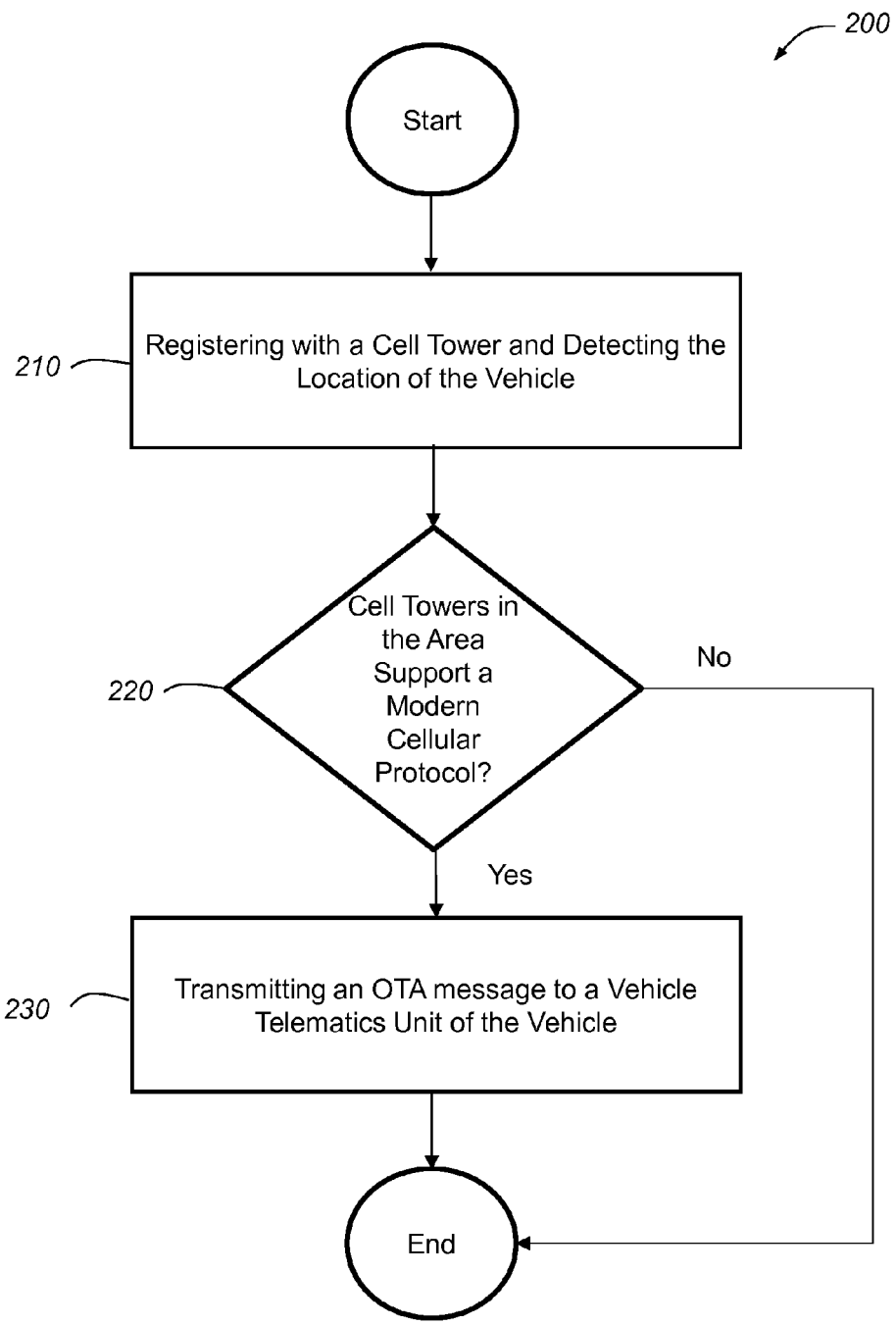
FIG. 2 is a flow chart depicting an embodiment of a method of controlling a vehicle telematics unit capable of supporting VoLTE.

Turning now to FIG. 2, there is shown an exemplary implementation of a method (200) of controlling a VoLTE-capable vehicle telematics unit 30. The method 200 begins at step 210 by registering with a cell tower and detecting the location of the vehicle telematics unit 30. As discussed above, the vehicle 12 may be deployed in a geographic area where cell towers predominantly support an earlier cellular protocol. For example, the vehicle 12 may be manufactured and delivered to an area where the wireless carrier system 14 uses 3G cellular protocols, which do not support VoLTE. The vehicle telematics unit 30 can perform a registration/attachment procedure that is carried out as part of communicating voice, data, or both via the wireless carrier system 14. Registration or attachment involves the vehicle telematics unit 30 scanning the area for wireless signals broadcast by cell towers. In one example, the vehicle telematics unit 30 can determine that cell towers 70 and 71 both support the earlier cellular protocol, such as 3G, and choose one of those cell towers for attachment—cell tower 70 for example. The vehicle telematics unit 30 may have attempted to locate and register with a cell tower supporting modern cellular protocols but could have been unable to locate one. Once cell tower 70 is chosen, the vehicle telematics unit 30 can exchange information as part of a handshake procedure for attachment that may vary depending on the cellular protocol.

In some implementations, the vehicle telematics unit 30 can use the GPS module 40 to receive the latitude and longitude coordinates of the vehicle 12 over the vehicle bus 44. The vehicle telematics unit 30 can obtain the coordinates in response to a message received at the vehicle telematics unit 30 from a central facility, such as a computer 18 or call center 20, or as real-time values that are updated as the vehicle 12 changes position. Once obtained, the vehicle telematics unit 30 can wirelessly transmit the location to the central facility. However, vehicle location can also be detected in other ways. For instance, the central facility can identify an address that is associated with the vehicle owner or operator and then determine that the vehicle is located at that address. The method 200 proceeds to step 220.

At step 220, it is determined that one or more cell towers within a range of the location have begun supporting a modern cellular protocol in addition to one or more cell towers supporting an earlier cellular protocol. A central facility can determine that a geographic area once only supporting earlier cellular protocols has now begun to provide cellular service using modern cellular protocols via one or more cell towers. The wireless carrier system 14 may provide updated geographical information to the central facility as the modern cellular protocol is implemented in new areas. The wireless carrier system 14 can identify a defined geographical area and inform the central facility that the area now supports modern cellular protocols. As the central facility receives the updated geographical information, the facility can compare the information to vehicle locations that were received from a plurality or fleet of vehicles. When the vehicle 12 is determined to be located in a geographic area that once serviced only earlier cellular protocols but now services modern cellular protocols, the central facility can decide to contact the vehicle telematics unit 30 using an over-the-air (OTA) message. The method 200 proceeds to step 230.

At step 230, an OTA message is wirelessly transmitted to the vehicle telematics unit 30 commanding it to detach from an attached cell tower 70 and re-attach to a cell tower using an IP multimedia subsystem (IMS) protocol. In response to determining that the vehicle 12 is now located in an area that services modern cellular protocols, the OTA can be sent from the central facility and received at the vehicle telematics unit 30. Continuing our example from above, the vehicle telematics unit 30 may remain attached to the cell tower 70 providing cellular service via an earlier cellular protocol despite the recently-implemented availability of cellular service based on a modern cellular protocol provided by cell tower 71. That is, cell tower 70 can support an earlier cellular protocol while cell tower 71 may support a modern cellular protocol. The vehicle telematics unit 30 can receive the OTA message and based on the OTA message detach from cell tower 70. The detachment process can be implemented by including a computer-readable instruction in the OTA message that the vehicle telematics unit 30 can execute to cause the unit 30 to powercycle or detach and initiate a reattachment process. In another implementation, the OTA message can include an identifier that the vehicle telematics unit 30 detects, which causes the vehicle telematics unit 30 to detach from the cell tower 70 and initiate a reattachment process. When the cell tower 71 offers a modern cellular protocol, the vehicle telematics unit 30 can be configured to prefer it when able to register with both cell tower 70 and 71. The vehicle telematics unit 30 can then establish VoLTE service with the cell tower 71 using the IMS protocol. The OTA message can also control the use of VoLTE cellular profiles stored at the vehicle 12. The OTA message can command the vehicle 12 to enable use of a VoLTE profile or the OTA message can deactivate or erase the VoLTE profile in the vehicle. The deactivation or erasure of the VoLTE profile can cause the vehicle telematics unit 30 to begin using circuit-switched cellular protocols. The method 200 then ends.

Figure 3:
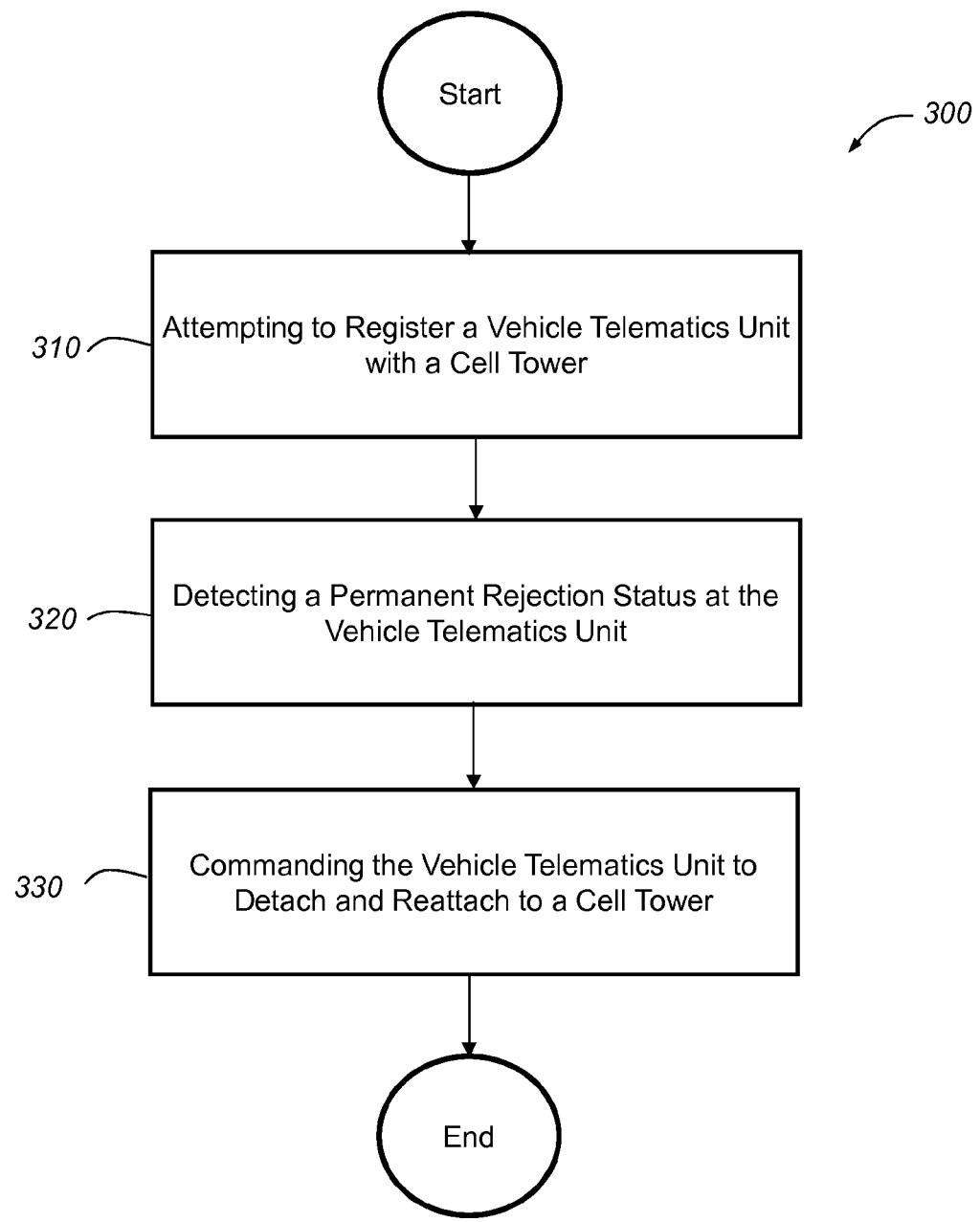
FIG. 3 is a flow chart depicting another embodiment of a method of controlling a vehicle telematics unit capable of supporting VoLTE.

With reference to FIG. 3, another exemplary implementation of a method (300) of controlling a VoLTE-capable vehicle telematics unit 300 is shown. The method 300 begins at step 310 by attempting to register the vehicle telematics unit 30 with a cell tower 70. In this example, the cell tower 70 may support an earlier cellular protocol that the vehicle telematics unit 30 selects when cell towers supporting modern cellular protocols are unavailable. However, sometimes the vehicle telematics unit 30 is configured to initially attempt a VoLTE attachment process using IMS to carry out its initial registration despite the lack of modern cellular protocol support. The method 300 proceeds to step 320.

At step 320, a permanent rejection status is detected at the vehicle telematics unit 30 that occurred as a result of the attempt to register. The VoLTE attachment process initiated by the vehicle telematics unit 30 may cause the cell tower 70 to transmit a message to the unit 30 that causes it to place itself in a permanent rejection status. When the cell tower 70 receives messages relating to the VoLTE attachment process, the cell tower 70 may not understand the messages and respond by transmitting a permanent rejection to the vehicle telematics unit 30. The permanent rejection status prevents the vehicle telematics unit 30 from registering or otherwise wirelessly communicating with the cell tower 70 until the unit 30 is reset in a way that removes the permanent rejection. With handheld UE, the permanent rejection status may be removed by removing the battery of the UE or otherwise powercycling the UE in a way that resets all of its registers. But a vehicle user is not generally able to carry out such an act with the vehicle telematics unit 30. As a result, the vehicle telematics unit 30 can be unable to communicate wirelessly until the vehicle 12 is driven to a dealership or other vehicle service facility who can reset the unit 30 to remove the permanent rejection status. The method 300 proceeds to step 330.

At step 330, the vehicle telematics unit is commanded to detach and re-attach to the cell tower in response to step 320. The vehicle telematics unit 30 can be configured or programmed to detect the permanent rejection status and take action to remove the status. For example, the vehicle telematics unit 30 can monitor for the permanent rejection status and after detecting it set a flag to remove the status based on a defined event. The defined event could be an ignition off/on or an amount of time that passes (e.g., 1 hour). Further, removing the permanent rejection status can be effected by powercycling the vehicle telematics unit 30 or by the processor 52 of the vehicle telematics unit 30 transmitting a command to the cellular chipset 50 over the vehicle bus 44 commanding the chipset 50 to reset itself. The method 300 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of controlling a VoLTE-capable vehicle telematics unit, comprising the steps of:
   (a) detecting the location of the vehicle telematics unit;
   (b) determining that one or more cell towers within a range of the location have begun supporting a modern cellular protocol providing packet-switched voice and data communications in addition to one or more other cell towers supporting an earlier cellular protocol, wherein the earlier cellular protocol does not support VoLTE; and
   (c) wirelessly transmitting an over-the-air (OTA) message to the vehicle telematics unit in response to step (b)

commanding the vehicle telematics unit to detach from an attached cell tower and re-attach to a cell tower using an IP multimedia subsystem (IMS) protocol.

2. The method of claim 1, wherein step (b) is carried out at a wireless carrier system.

3. The method of claim 1, wherein step (b) further comprises comparing the location of the vehicle telematics unit to a geographical area in which a wireless carrier system has begun to support the modern cellular protocol.

4. The method of claim 1, wherein the OTA message includes an identifier the vehicle telematics unit detects that causes the vehicle telematics unit to detach from the attached cell tower.

5. The method of claim 1, wherein the OTA message includes a computer-readable command the vehicle telematics unit reads and executes causing the vehicle telematics unit to detach from the attached cell tower.

6. A method of controlling a VoLTE-capable vehicle telematics unit, comprising the steps of:

(a) attempting to register the vehicle telematics unit with a cell tower using a VoLTE cellular protocol;

(b) detecting a permanent rejection status at the vehicle telematics unit that occurred as a result of the attempt to register using the VoLTE cellular protocol and prevents the vehicle telematics unit from communicating via the cell tower; and (c) commanding the vehicle telematics unit to detach and re-attach to the cell tower in response to step (b), which comprises transmitting a message from a processor in the vehicle telematics unit to a cellular chipset in the vehicle telematics unit.

7. The method of claim 6, wherein the vehicle telematics unit is commanded in response to a vehicle ignition off and a vehicle ignition on sequence.

8. The method of claim 6, wherein the vehicle telematics unit is commanded in response to the passage of a defined period of time.

* * * * *